(12) United States Patent
Oyagi et al.

(10) Patent No.: US 12,275,424 B2
(45) Date of Patent: Apr. 15, 2025

(54) CONTROL DEVICE

(71) Applicant: TOYOTA JIDOSHA KABUSHIKI KAISHA, Toyota (JP)

(72) Inventors: Hiroshi Oyagi, Kyoto (JP); Hirokazu Ito, Sunto-gun Shizuoka (JP); Shinya Shiratori, Susono (JP); Norimi Asahara, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 18/371,481

(22) Filed: Sep. 22, 2023

(65) Prior Publication Data

US 2024/0140466 A1 May 2, 2024

(30) Foreign Application Priority Data

Oct. 28, 2022 (JP) .................................. 2022-173705

(51) Int. Cl.
*G08B 23/00* (2006.01)
*B60W 40/08* (2012.01)
*B60W 40/105* (2012.01)
*B60W 50/14* (2020.01)

(52) U.S. Cl.
CPC ............ *B60W 50/14* (2013.01); *B60W 40/08* (2013.01); *B60W 40/105* (2013.01); *B60W 2040/0818* (2013.01); *B60W 2050/143* (2013.01); *B60W 2050/146* (2013.01); *B60W 2540/229* (2020.02); *B60W 2554/802* (2020.02); *B60W 2555/60* (2020.02); *B60W 2556/10* (2020.02)

(58) Field of Classification Search
CPC .... B60W 50/14; B60W 40/08; B60W 40/105; B60W 2040/0818; B60W 2050/143; B60W 2050/146; B60W 2540/229; B60W 2554/802; B60W 2555/60; B60W 2556/10
USPC ...................... 340/576, 573.1, 435, 436, 439
See application file for complete search history.

(56) References Cited

U.S. PATENT DOCUMENTS

| | | | | |
|---|---|---|---|---|
| 2018/0174464 | A1* | 6/2018 | Ikedo | G08G 1/166 |
| 2021/0107505 | A1* | 4/2021 | Matsunaga | G01S 15/931 |
| 2021/0245769 | A1* | 8/2021 | Yamaoka | B60W 30/0956 |
| 2022/0009524 | A1* | 1/2022 | Oba | B60W 60/0057 |
| 2022/0063607 | A1* | 3/2022 | Daniel | B60W 10/04 |
| 2023/0045706 | A1* | 2/2023 | Jeong | G08G 1/0137 |

FOREIGN PATENT DOCUMENTS

| | | |
|---|---|---|
| JP | H06-119600 A | 4/1994 |
| JP | H10-288532 A | 10/1998 |

* cited by examiner

*Primary Examiner* — Anh V La
(74) *Attorney, Agent, or Firm* — Dinsmore & Shohl LLP

(57) ABSTRACT

A control device includes: a controller controlling a first vehicle, the controller being configured to estimate a degree of concentration of a driver in the first vehicle during traveling of the first vehicle based on a first distance between the first vehicle and a second vehicle traveling in front of the first vehicle, a second distance between the first vehicle and a third vehicle traveling behind the first vehicle, and a relationship between a vehicle speed of the first vehicle and a predetermined vehicle speed, and execute a vehicle control of recovering the concentration of the driver based on an estimation result.

4 Claims, 2 Drawing Sheets

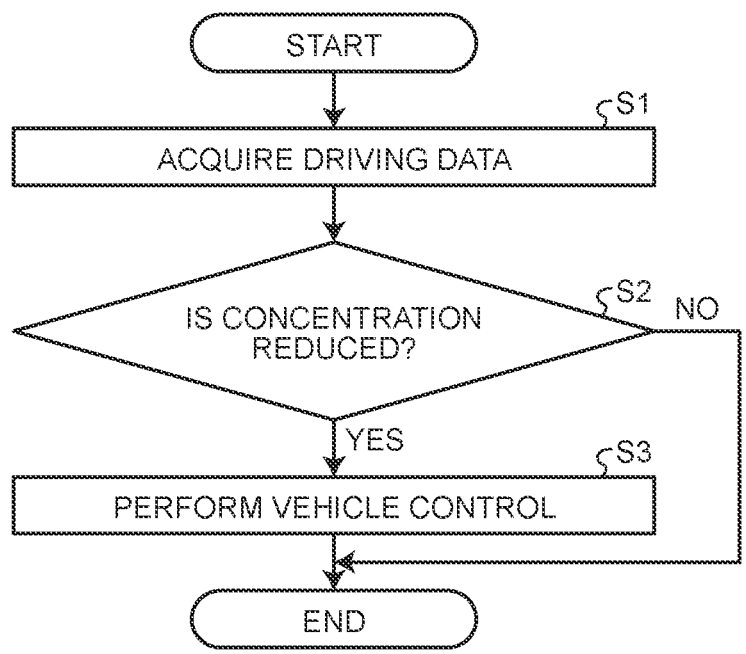

CONTROL DEVICE

The present application claims priority to and incorporates by reference the entire contents of Japanese Patent Application No. 2022-173705 filed in Japan on Oct. 28, 2022.

BACKGROUND

The present disclosure relates to a control device.

JP-A-6-119600 discloses that a control device mounted on a vehicle issues a warning to a driver during traveling of the vehicle of the driver on the basis of an inter-vehicle distance between a vehicle of the driver and a front vehicle that is in front of the vehicle of the driver. In the control device described in JP-A-6-119600, the inter-vehicle distance for issuing the warning can be changed depending on a degree of concentration of the driver.

SUMMARY

Regarding the configuration described in JP-A-6-119600, it is conceivable to change the inter-vehicle distance for issuing a warning using, for example, a learned model created by machine learning. However, in a case where the driver cannot grasp a surrounding situation due to decreasing of the concentration of the driver during traveling of the vehicle of the driver, the configuration described in JP-A-6-119600 can prevent a rear-end collision to the front vehicle but cannot consider a rear vehicle that is traveling behind the vehicle of the driver.

There is a need for a control device capable of estimating a degree of concentration of a driver during traveling of a vehicle of the driver in consideration of a front vehicle traveling in front of the vehicle of the driver and a rear vehicle traveling behind the vehicle of the driver.

According to one aspect of the present disclosure, there is a control device including: a controller controlling a first vehicle, the controller being configured to estimate a degree of concentration of a driver in the first vehicle during traveling of the first vehicle based on a first distance between the first vehicle and a second vehicle traveling in front of the first vehicle, a second distance between the first vehicle and a third vehicle traveling behind the first vehicle, and a relationship between a vehicle speed of the first vehicle and a predetermined vehicle speed, and execute a vehicle control of recovering the concentration of the driver based on an estimation result.

The above and other features, advantages and technical and industrial significance of this disclosure will be better understood by reading the following detailed description of embodiments of the disclosure, when considered in connection with the accompanying drawings.

BRIEF DESCRIPTION OF THE DRAWINGS

FIG. 3 is a flowchart illustrating an estimation control.

DETAILED DESCRIPTION

Hereinafter, a control device according to an embodiment of the disclosure will be described in detail. The disclosure is not limited to the embodiments described below.

Figure 1:
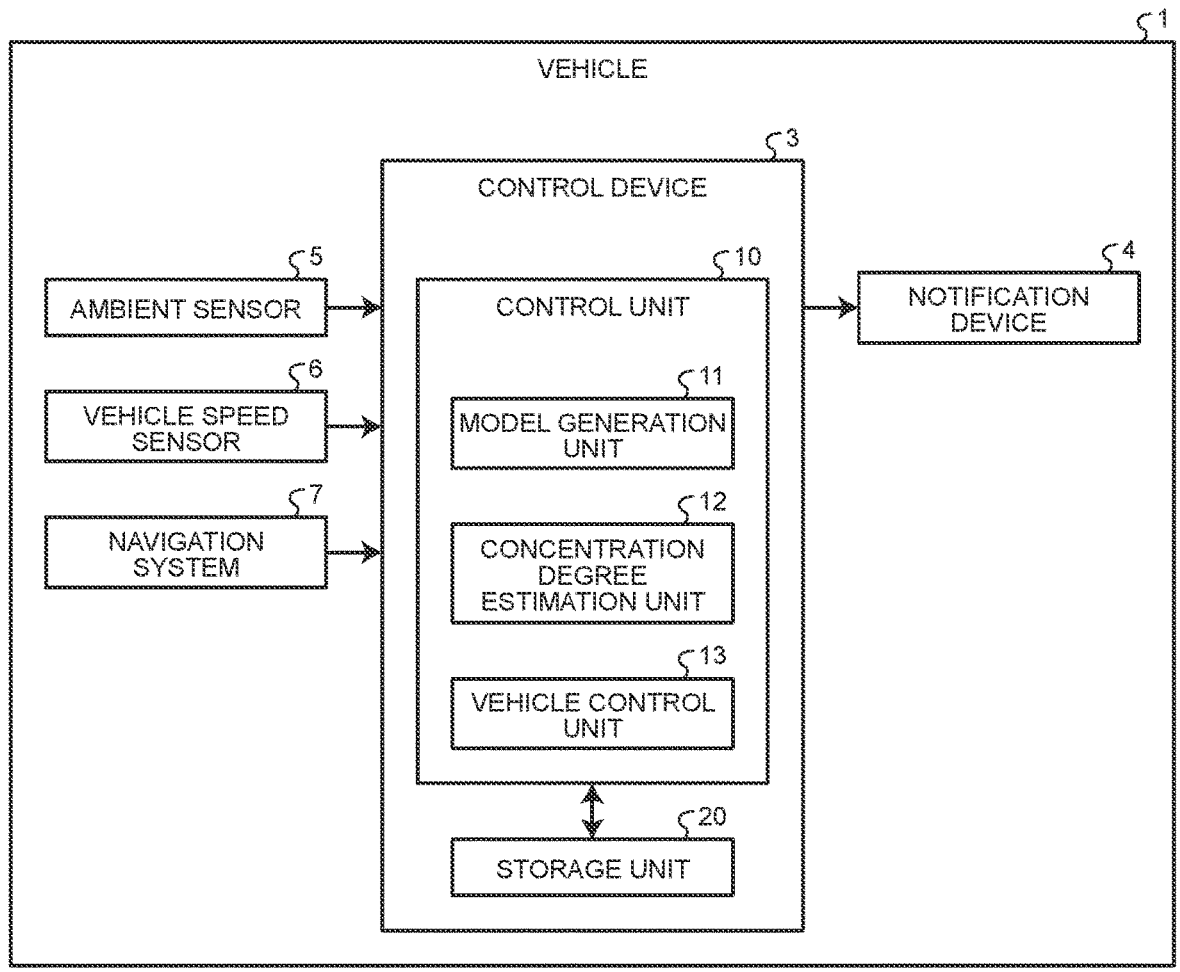
FIG. 1 is a block diagram explaining a vehicle in an embodiment.
Figure 2:
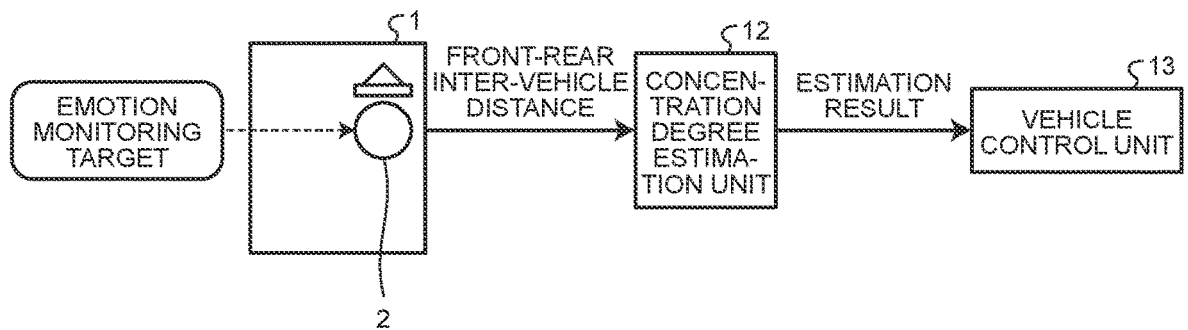
FIG. 2 is a diagram schematically illustrating an estimation flow.

FIG. 1 is a block diagram explaining a vehicle according to an embodiment. FIG. 2 is a diagram schematically illustrating an estimation flow. A vehicle 1 estimates a degree of concentration of a driver 2 during traveling of the vehicle 1. The driver 2 of the vehicle 1 is an estimation target of the degree of concentration during traveling of the vehicle 1, that is, an emotion monitoring target during traveling of the vehicle 1. An estimation model generated by machine learning is used to estimate the degree of concentration. When it is estimated that the concentration of the driver 2 is reduced during traveling of the vehicle 1, the vehicle 1 issues a warning to the driver 2. The warning to the driver by the vehicle 1 can inform the driver that the concentration of the driver is reduced and can encourage the driver to recover the concentration of the driver.

As illustrated in FIG. 1, the vehicle 1 includes a control device 3, a notification device 4, an ambient sensor 5, a vehicle speed sensor 6, and a navigation system 7.

The control device 3 is an electronic control device that controls the vehicle 1. The electronic control device includes a processor and a memory (main storage unit). The processor includes a central processing unit (CPU), a digital signal processor (DSP), a field-programmable gate array (FPGA), a graphics processing unit (GPU), and the like. The memory includes a random access memory (RAM), a read only memory (ROM), and the like. Further, signals from various sensors mounted on the vehicle 1 are input to the control device 3. The control device 3 executes vehicle control based on the signals input from various sensors.

For example, a signal from the ambient sensor 5, a signal from the vehicle speed sensor 6, and the like are input to the control device 3. The ambient sensor 5 acquires information about a three-dimensional object existing in surroundings of the vehicle 1. The ambient sensor 5 includes a radar sensor and a camera sensor. The radar sensor is a so-called millimeter wave radar. The camera sensor includes a front camera and a rear camera. The front camera captures a landscape in front of the vehicle 1 to acquire image data. The rear camera captures a landscape behind the vehicle 1 to acquire image data. The vehicle speed sensor 6 detects a speed of the vehicle 1. The ambient sensor 5 outputs driving information including information on a front-rear inter-vehicle distance with respect to the vehicle 1 to the control device 3. The vehicle speed sensor 6 outputs driving information including information about the vehicle speed of the vehicle 1 to the control device 3.

Further, a signal from the navigation system 7 is input to the control device 3. The navigation system 7 outputs driving information including information on a speed limit of a road on which the vehicle 1 is traveling to the control device 3.

The control device 3 includes a control unit 10 that executes vehicle control using driving information, and a storage unit 20 that stores a configuration for executing vehicle control.

While the vehicle 1 is traveling, the control unit 10 executes the vehicle control by using information input from the ambient sensor 5, the vehicle speed sensor 6, and the navigation system 7 to the control device 3 and by using information stored in the storage unit 20.

The vehicle control includes estimation control estimating the degree of concentration of the driver 2 during traveling of the vehicle 1, and notification control notifying the driver 2 that the concentration of the driver 2 is reduced during traveling of the vehicle 1. The control unit 10 estimates the degree of concentration of the driver 2 using the estimation model. In accordance with the estimation result, the control unit 10 issues a warning to the driver 2. The estimation model is a learned model generated by machine learning. When the control unit 10 estimates the degree of concentration of the driver 2 using the estimation model, the control unit 10 estimates the degree of concentration of the driver 2 using the driving information. That is, the controller 10 can estimate the degree of concentration of the driver 2 without using the biological information of the driver 2.

The control unit 10 includes a model generation unit 11, a concentration degree estimation unit 12, and a vehicle control unit 13.

The model generation unit 11 generates an estimation model by machine learning. The estimation model is an estimation model for estimating the degree of concentration of the driver 2, and is a learned model learned by machine learning.

For example, the model generation unit 11 generates an estimation model by supervised machine learning. In the supervised machine learning, a set of driving information acquired in the past and the degree of concentration of the driver 2 is set as teacher data. In the teacher data, the driving information of the vehicle 1 is used as input data, and the degree of concentration of the driver 2 of the vehicle 1 is used as output data.

The driving information serving as the input data in the teacher data includes an inter-vehicle distance to a front vehicle, an inter-vehicle distance to a rear vehicle, and a vehicle speed with respect to the speed limit. The inter-vehicle distance to the front vehicle is a distance between the vehicle 1 and a front vehicle that travels in front of the vehicle 1. The inter-vehicle distance to the rear vehicle is a distance between the vehicle 1 and a rear vehicle that travels behind the vehicle 1. The vehicle speed with respect to the speed limit is a current vehicle speed of the vehicle 1 with respect to a speed limit on a road on which the vehicle 1 is traveling.

The degree of concentration of the driver 2 as the output data in the teacher data is a preset degree of concentration. The degree of concentration of the driver 2 is defined by two states: a decrease state indicating that the concentration of the driver 2 is reduced, and a normal state indicating that the concentration of the driver 2 is normal. Therefore, the output data used for the teacher data is one of the decrease state and the normal state.

As an example, when information including information indicating that the inter-vehicle distance to the front vehicle is large, information indicating that the vehicle speed is below the speed limit, and information indicating that the inter-vehicle distance to the rear vehicle is narrow is input data, the output data is in a decrease state indicating that the concentration of the driver 2 is reduced. As described above, the model generation unit 11 can determine in advance a condition under which the concentration of the driver 2 is determined to be reduced, and perform machine learning using the teacher data satisfying the condition as input data. In other words, the model generation unit 11 can determine in advance a condition under which the concentration of the driver 2 is determined to be in a normal state, and perform machine learning using the teacher data satisfying the condition as input data. Then, the model generation unit 11 stores the generated estimation model in the storage unit 20.

The model generation unit 11 generates the estimation model at the time of stopping of the vehicle 1. When the vehicle 1 is stopped, the model generation unit 11 generates the estimation model based on a travel history of the vehicle 1. The travel history of the vehicle 1 is information indicating a travel record stored in the storage unit 20. The control unit 10 stores, in the storage unit 20, the driving information acquired during traveling of the vehicle 1 as a traveling result. Therefore, the control unit 10 can acquire the travel history by referring to the storage unit 20.

The concentration degree estimation unit 12 estimates the degree of concentration of the driver 2 during traveling of the vehicle by using the driving information acquired during traveling of the vehicle 1 and by using the estimation model generated prior to traveling of the vehicle 1. The concentration degree estimation unit 12 calculates the inter-vehicle distance to the front vehicle, the inter-vehicle distance to the rear vehicle, and a relationship between the vehicle speed and the speed limit on the basis of the information acquired from the ambient sensor 5, the vehicle speed sensor 6, and the navigation system 7 during traveling of the vehicle 1. The relationship between the vehicle speed and the speed limit indicates that the current vehicle speed of the vehicle 1 is over the speed limit, that the current vehicle speed of the vehicle 1 is below the speed limit, and that the current vehicle speed of the vehicle 1 is the same as the speed limit. Using the calculation result and the estimation model stored in the storage unit 20, the concentration degree estimation unit 12 estimates the concentration of the driver 2. The concentration degree estimation unit 12 acquires the estimation model with reference to the storage unit 20.

As illustrated in FIG. 2, the concentration degree estimation unit 12 outputs the estimation result to the vehicle control unit 13. The estimation result by the concentration degree estimation unit 12 includes a result indicating that the concentration of the driver is normal and a result indicating that the concentration of the driver is reduced. The concentration degree estimation unit 12 determines whether or not the concentration of the driver 2 is reduced based on the driving information and the estimation model. The concentration degree estimation unit 12 performs a process of estimating the concentration and a process of determining whether or not the concentration is reduced. When the concentration degree estimation unit 12 determines that the concentration of the driver 2 is reduced, the estimation result output from the concentration degree estimation unit 12 to the vehicle control unit 13 includes a determination result indicating that the concentration of the driver 2 is reduced.

The vehicle control unit 13 notifies that the concentration of the driver 2 is reduced according to the estimation result. The vehicle control unit 13 executes notification control. The vehicle control unit 13 controls the notification device 4.

The notification device 4 is a speaker, a display device, or the like. The notification device 4 is a human machine interface (HMI). When the vehicle control unit 13 executes the notification control, the notification device 4 outputs a sound and displays an image.

FIG. 3 is a flowchart illustrating estimation control. The control illustrated in FIG. 3 is repeatedly executed by the control device 3 when the vehicle 1 is traveling.

The control device 3 acquires driving data (step S1). In the process of the step S1, the driving data indicating a present state of the vehicle 1 is acquired. The control device 3 acquires an inter-vehicle distance to the front vehicle and an inter-vehicle distance to the rear vehicle based on the input signal from the ambient sensor 5. Further, the control device 3 acquires the current vehicle speed of the vehicle 1 based on the input signal from the vehicle speed sensor 6. Furthermore, the control device 3 acquires the speed limit of the road on which the vehicle 1 is traveling based on the input signal from the navigation system 7.

The control device 3 determines whether or not the concentration of the driver 2 is reduced (step S2). In the step S2, the degree of concentration of the driver 2 is estimated based on the driving data acquired in the step S1 and the estimation model generated in advance. Further, in the step S2, it is determined whether or not the estimated degree of concentration indicates a decrease in the concentration of the driver 2. For example, in step S2, the control device 3 determines whether the inter-vehicle distance to the front vehicle is large and the inter-vehicle distance to the rear vehicle is narrow and further determines whether the vehicle speed is below the speed limit.

When it is determined that the concentration of the driver 2 is not reduced (step S2: No), the control routine ends.

When it is determined that the concentration of the driver 2 is reduced (step S2: Yes), the control device 3 executes notification control as vehicle control (step S3). In the step S3, a warning is issued from the notification device 4 to the driver 2. The notification device 4 outputs a sound or displays an image. When the steps S3 are executed, the control routine ends.

As described above, according to the embodiment, the control device 3 can estimate the degree of concentration of the driver 2 when the vehicle 1 is traveling. When the control device 3 estimates that the concentration of the driver 2 has decreased, the control device 3 executes notification control to notify the driver 2 that the concentration has decreased. This makes it possible to urge the driver 2 to recover the concentration. Therefore, when the driver 2 lacks the concentration during traveling of the vehicle 1, it is possible to return to a concentrated state at an early stage, the concentrated state being a state in which the concentration of the driver is normal.

The method of acquiring the inter-vehicle distance to the front vehicle and the inter-vehicle distance to the rear vehicle is not particularly limited. The disclosure is not limited to a method of calculating the front-rear inter-vehicle distance using the front camera and the rear camera. The inter-vehicle distance to the front vehicle may be calculated using a millimeter wave radar. Similarly, the inter-vehicle distance to the rear vehicle may be calculated using a millimeter wave radar.

The method of acquiring the speed limit is not particularly limited. The method is not limited to the method of acquiring the speed limit using the navigation system 7. For example, the image data captured by the front camera can be analyzed to obtain information about the speed limit of the road based on an image of a sign from the captured image data. Alternatively, the control device 3 can receive information on the road by wireless communication with a roadside device. That is, the information acquired by the communication between the control device 3 and the roadside device includes information on the speed limit of the road.

Further, the estimation model may not be generated by the vehicle 1. For example, a server or the like installed outside the vehicle 1 may generate an estimation model. That is, the model generation unit 11 may be provided in the server. The vehicle 1 acquires the estimation model by wireless communication with the server. The estimation model acquired from the server is stored in the storage unit 20. In this case, the estimation model may be updated to the latest information when storing the estimation model in the storage unit 20.

Further, the control device 3 includes various control devices.

The control device 3 according to a first modification is configured to estimate the degree of concentration of the driver 2 based on the characteristics of the driver 2. The characteristics of the driver 2 are specified by a driving tendency of the driver 2 when the driver 2 is driving the vehicle 1. The driving tendency includes, for example, a tendency to drive the vehicle slower than the speed limit at usual time. When the driver 2 having this characteristic is driving the vehicle at a lower speed than usual, the control device 3 can determine that the concentration of the driver 2 is reduced.

Specifically, in a state in which the distance between the front vehicle and the vehicle 1 is large and the distance between the rear vehicle and the vehicle 1 is narrow and further in a case where the vehicle speed of the vehicle 1 is slower than the normal vehicle speed, the control device 3 estimates that the concentration of the driver 2 is reduced. The slowness of the vehicle speed is determined not only according to the speed limit but also according to the characteristics of the driver 2. The control device 3 uses a reference vehicle speed set by reflecting the driving tendency of the driver 2 based on the traveling history of the vehicle 1.

For example, in machine learning, a deviation range indicating how much a vehicle speed at a normal time deviates from the speed limit is learned. By doing this, it is learned whether the driver 2 is a driver which is driving the vehicle at a slower speed at usual time or a driver which is driving the vehicle at a faster speed at usual time. The input data used for machine learning includes the inter-vehicle distance to the front vehicle, a vehicle speed assuming the current vehicle speed, a vehicle speed at usual time (reference vehicle speed), and the inter-vehicle distance to the rear vehicle.

In addition, the control device 3 of a second modification example can estimate the degree of concentration of the driver 2 when the vehicle is traveling by automatic driving. For example, the vehicle 1 is a vehicle used for automatic driving. In the automatic driving, it is assumed that an automatic driving control that needs to be monitored by the driver 2 is being executed.

Specifically, the control unit 10 of the second modification can execute a control for suppressing an intervention of the automatic driving control. When the control unit 10 determines that the concentration of the driver 2 has decreased during executing of the automatic driving control that needs to be monitored by the driver 2 in the automatic driving, the control unit 10 suppresses the intervention of the automatic driving control. This makes it possible to urge the driver 2 to recover the concentration.

Further, the control unit 10 can execute an air-conditioning control for controlling an air-conditioning device of the vehicle 1 as the vehicle control for recovering the concentration of the driver 2. In the air-conditioning control, the air-conditioning device is controlled so as to apply cold air to the driver 2. Thereby, it is possible to give the driver 2 a cold sensation stimulus. Alternatively, in the air-conditioning control, the air-conditioning device is controlled so as to reduce a carbon dioxide concentration by a ventilation by an introduction of air of an outside of the vehicle into the vehicle.

According to the embodiment, it is possible to estimate the degree of concentration of the driver based on the distance between the vehicle of the driver and the front vehicle and on the distance between the vehicle of the driver and the rear vehicle. Therefore, during traveling of the vehicle of the driver, the degree of concentration of the driver can be estimated in consideration of the front vehicle and the rear vehicle.

According to the embodiment, a warning by a sound or an image display can be issued to the driver whose concentration is reduced. Thus, the driver can be urged to recover the concentration.

According to the embodiment, in a case where the distance between the vehicle of the driver and the rear vehicle is short even though the distance between the vehicle of the driver and the front vehicle is long, the degree of concentration of the driver can be estimated from the relationship with the vehicle speed with respect to the speed limit. Therefore, the degree of concentration of the driver can be estimated in consideration of the rear vehicle.

According to the embodiment, even when monitoring by the driver is required during automatic driving, it is possible to notify the driver that the concentration of the driver is reduced. Thus, the driver can be urged to recover the concentration.

Additional aspects and modifications will readily occur to those skilled in the art. Therefore, the disclosure in its broader aspects is not limited to the specific details and representative embodiments shown and described herein. Accordingly, various modifications may be made without departing from the spirit or scope of the general concept as defined by the appended claims and their equivalents.

What is claimed is:

1. A control device comprising:
   a controller controlling a first vehicle, the controller being configured to:
   estimate a degree of concentration of a driver in the first vehicle during traveling of the first vehicle based on a first distance between the first vehicle and a second vehicle traveling in front of the first vehicle, a second distance between the first vehicle and a third vehicle traveling behind the first vehicle, and a relationship between a vehicle speed of the first vehicle and a predetermined vehicle speed, and
   execute a vehicle control of recovering the concentration of the driver based on an estimation result,
   wherein the predetermined vehicle speed is a speed limit on a road on which the first vehicle is traveling, and
   wherein when the first distance is large, the second distance is narrow, and the vehicle speed of the first vehicle is below the speed limit, the controller is configured to estimate that the concentration of the driver is reduced.

2. The control device according to claim 1, wherein the vehicle control includes a notification control of issuing a warning by a sound or an image display.

3. The control device according to claim 1, wherein
   when it is estimated that the concentration of the driver is reduced during executing of an automatic driving control requiring monitoring by the driver in an automatic driving for the first vehicle, the controller is further configured to suppress an intervention of the automatic driving control to the first vehicle.

4. A control device comprising:
   a controller controlling a first vehicle, the controller being configured to:
   estimate a degree of concentration of a driver in the first vehicle during traveling of the first vehicle based on a first distance between the first vehicle and a second vehicle traveling in front of the first vehicle, a second distance between the first vehicle and a third vehicle traveling behind the first vehicle, and a relationship between a vehicle speed of the first vehicle and a predetermined vehicle speed, and
   execute a vehicle control of recovering the concentration of the driver based on an estimation result,
   wherein the predetermined vehicle speed is a reference vehicle speed that is set by reflecting a driving tendency of the driver based on a travel history of the first vehicle, and
   wherein when the first distance is large, the second distance is narrow, and the vehicle speed of the first vehicle is below the reference vehicle speed, the controller is configured to estimate that the concentration of the driver is reduced.

* * * * *